United States Patent
Baldwin et al.

(10) Patent No.: US 7,107,866 B2
(45) Date of Patent: Sep. 19, 2006

(54) SINGLE CLUTCH LAYSHAFT TRANSMISSION

(75) Inventors: Reid Baldwin, Howell, MI (US); David Janson, Plymouth, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 10/803,835

(22) Filed: Mar. 18, 2004

(65) Prior Publication Data

US 2005/0204842 A1  Sep. 22, 2005

(51) Int. Cl.
*F16H 3/08* (2006.01)
(52) U.S. Cl. .......................................... 74/331; 74/333
(58) Field of Classification Search ................. 74/329, 74/331, 333
See application file for complete search history.

(56) References Cited

U.S. PATENT DOCUMENTS

| | | | | |
|---|---|---|---|---|
| 4,461,188 A | * | 7/1984 | Fisher | 74/331 |
| 4,463,621 A | * | 8/1984 | Fisher | 74/331 |
| 4,594,908 A | * | 6/1986 | Akashi et al. | 74/331 |
| 5,425,283 A | * | 6/1995 | Wehking | 74/331 |
| 5,558,173 A | * | 9/1996 | Sherman | 180/53.8 |
| 6,460,425 B1 | * | 10/2002 | Bowen | 74/331 |
| 6,880,418 B1 | * | 4/2005 | Janson et al. | 74/331 |

* cited by examiner

*Primary Examiner*—Roger Pang
(74) *Attorney, Agent, or Firm*—David B. Kelley

(57) ABSTRACT

A transmission includes an input, a first layshaft, a second layshaft, a first power path for transmitting power between the input and first layshaft and producing a first ratio of a speed of the first layshaft and a corresponding speed of the input, a second power path for transmitting power between the input and second layshaft and producing a second ratio of the speed of the second layshaft and corresponding speed of the input; and a clutch for releasably connecting the input and the output.

19 Claims, 7 Drawing Sheets

|    |     | Number of Teeth |
|----|-----|-----------------|
| 50 | G1  | 41 |
| 46 | G2  | 41 |
| 42 | G3  | 33 |
| 54 | G4  | 26 |
| 58 | G5  | 21 |
| 48 | G7  | 19 |
| 44 | G8  | 30 |
| 40 | G9  | 37 |
| 52 | G10 | 43 |
| 56 | G11 | 45 |
| 26 | G13 | 30 |
| 28 | G14 | 49 |
| 36 | G15 | 26 |
| 38 | G16 | 43 |
| 62 | G17 | 37 |
| 60 | G18 | 19 |

Figure 2

|      | Torque Ratio | Step  |
|------|--------------|-------|
| Rev  | -3.181       | 0.902 |
| 1st  | 3.525        |       |
| 2nd  | 2.232        | 1.579 |
| 3rd  | 1.457        | 1.532 |
| 4th  | 0.988        | 1.475 |
| 5th  | 0.762        | 1.361 |

Figure 3

|         | Torque Ratio | Step  |
|---------|--------------|-------|
| Alt 1st | 3.569        | 1.013 |
| Alt 2nd | 2.260        | 1.013 |
| Alt 3rd | 1.475        | 1.013 |
| Alt 4th | 1.000        | 1.013 |

| | | Number of Teeth |
|---|---|---|
| 90 | G1 | 41 |
| | G2 | 41 |
| | G3 | 33 |
| | G4 | 27 |
| | G5 | 21 |
| | G6 | 23 |
| 92 | G7 | 19 |
| | G8 | 30 |
| | G9 | 37 |
| | G10 | 43 |
| | G11 | 45 |
| | G12 | 62 |
| 26 | G13 | 23 |
| | G14 | 49 |
| 36 | G15 | 21 |
| 38 | G16 | 45 |
| | G17 | 41 |
| | G18 | 19 |

| | Torque Ratio | Step |
|---|---|---|
| Rev | -4.597 | |
| 1st | 4.597 | |
| 2nd | 2.912 | 1.579 |
| 3rd | 1.900 | 1.532 |
| 4th | 1.338 | 1.420 |
| 5th | 0.994 | 1.346 |
| 6th | 0.790 | 1.258 |

Figure 7

| | Torque Ratio | Step |
|---|---|---|
| Alt 1st | 4.624 | 1.006 |
| Alt 2nd | 2.929 | 1.006 |
| Alt 3rd | 1.911 | 1.006 |
| Alt 4th | 1.346 | 1.006 |
| Alt 5th | 1.000 | 1.006 |

|  |  | Number of Teeth |
|---|---|---|
|  | G1 | 41 |
|  | G2 | 41 |
|  | G3 | 33 |
|  | G4 | 27 |
|  | G7 | 19 |
|  | G8 | 30 |
|  | G9 | 37 |
|  | G10 | 43 |
| 36 | G13 | 23 |
|  | G14 | 49 |
|  | G15 | 21 |
|  | G16 | 45 |
|  | G17 | 41 |
|  | G18 | 19 |

|  | Torque Ratio | Step |
|---|---|---|
| Rev | -4.597 |  |
| 1st | 4.597 |  |
| 2nd | 2.912 | 1.579 |
| 3rd | 1.900 | 1.532 |
| 4th | 1.338 | 1.420 |
| 5th | 1.000 | 1.338 |

Figure 11

|  | Torque Ratio | Step |
|---|---|---|
| Alt 1st | 4.624 | 1.006 |
| Alt 2nd | 2.929 | 1.006 |
| Alt 3rd | 1.911 | 1.006 |
| Alt 4th | 1.346 | 1.006 |

Figure 12

SINGLE CLUTCH LAYSHAFT TRANSMISSION

BACKGROUND OF THE INVENTION

This invention pertains to the field of automatic shift manual transmissions and select shift manual transmissions, particularly to the types of these transmissions applicable to motor vehicles.

Automatic transmissions for transmitting power between an input and an output, either over a continuously variable range of speed ratios or in discrete step changes among speed ratios, have associated with them several sources of parasitic losses, which adversely affect fuel economy. These losses are associated with a torque converter, open friction clutches and brakes, hydraulic pump, and gear meshes.

To improve fuel economy in a motor vehicle having an automatic transmission, an automated shift manual (ASM) transmission can be used to eliminate or substantially reduce all of these parasitic losses except gear mesh losses. Such transmissions generally produce gear ratio changes by first interrupting torque transmitted from the engine to the transmission input, preparing the transmission components associated with the next speed ratio, and then restoring torque. A primary functional feature of such transmissions is the need to interrupt power transmitted from the engine to the transmission input shaft before or during each gear ratio change. This requirement can result in low quality gear ratio changes, which a vehicle operator or passenger may sense as noise, vibration and harshness.

A transmission operating in accordance with the present invention avoids entirely any interruption of power during gear ratio changes and avoids the inherent shift quality problems. This invention, however, also reduces the magnitude of parasitic losses inherent in the operation of an automatic transmission to the much lower magnitude typically associated with conventional ASM transmission.

SUMMARY OF THE INVENTION

A transmission according to the present invention includes only one friction clutch for releasably connecting a source of power, such as an engine or motor, and a transmission input. Gear ratio changes are accomplished through the use of couplers, such as synchronizers or dog clutches, which mutually driveably connect components operative in each speed ratio. The couplers produce very little drag loss when engaged, and do not require a continuous supply of power to stay engaged.

Power interruption during shifting is avoided by providing alternate power paths, which transmit power between a transmission input and the output during a gear ratio change. A secondary power path bypasses the friction clutch, but contains a one-way clutch. Before starting an upshift from an initial gear to a higher gear, one power path is set for a slightly lower speed ratio than the initial gear by engaging synchronizers or dog clutches, thereby causing the one-way clutch to overrun. In order to transfer power to the second torque path, the friction clutch is released and the secondary power path carries torque through the one-way clutch. Transfer of torque to the secondary power path is essentially a downshift to a speed ratio that is slightly lower than the current or off-going gear ratio.

While the secondary power path carries torque, the main or primary power path is set similarly for the destination gear of the gearshift by engaging synchronizers or dog clutches. When the friction clutch is re-engaged, torque is transferred back to the primary torque path causing the one-way clutch to overrun again. Downshifts are accomplished by reversing this sequence of steps.

One gear ratio of the transmission is a direct drive produced by a coupler that connects the input and output without the speed reductions or speed increases that occur in each other gear. The principle of the present invention can be applied to all of the up-shifts of a particular transmission or any number of the up-shifts depending upon the number of secondary torque paths that are provided.

In realizing these advantages, a power transmission according to this invention includes an input, output, a first layshaft, and second layshaft, each supported for rotation. A first power path transmits power between the input and first layshaft and produces a first ratio of a speed of the first layshaft and a speed of the input. A second power path transmits power between the input and second layshaft and produces a second ratio of a speed of the second layshaft and a speed of the input. A clutch driveably connects and disconnects the input and the first power path. A coupler driveably connects and disconnects the output and the input.

Various objects and advantages of this invention will become apparent to those skilled in the art from the following detailed description of the preferred embodiment, when read in light of the accompanying drawings.

BRIEF DESCRIPTION OF THE DRAWINGS

FIG. 2 is a chart containing an example showing the number of teeth for each of the gears and pinions shown in FIG. 1;

FIG. 3 is a chart containing the torque ratios between the input and output and steps between the torque ratios for each of the forward gears and the reverse gear of the transmission of FIG. 1, the gears and pinions having the number of teeth shown in FIG. 2;

FIG. 4 is a chart containing the torque ratios between the input and output, and steps between the torque ratios for each of the alternate power paths of the transmission of FIG. 1.

FIG. 6 is a chart containing an example showing the number of teeth for each of the gears and pinions shown in FIG. 5;

FIG. 7 is a chart containing the torque ratios between the input and output and steps between the torque ratios for each of the forward gears and the reverse gear of the transmission of FIG. 5, the gears and pinions having the number of teeth shown in FIG. 6;

FIG. 8 is a chart containing the torque ratios between the input and output, and steps between the torque ratios for each of the alternate power paths of the transmission of FIG. 5.

FIG. 10 is a chart containing an example showing the number of teeth for each of the gears and pinions shown in FIG. 9;

FIG. 11 is a chart containing the torque ratios between the input and output and steps between the torque ratios for each of the forward gears and the reverse gear of the transmission of FIG. 9, the gears and pinions having the number of teeth shown in FIG. 8; and FIG. 12 is a chart containing the torque ratios between the input and output, and steps between the torque ratios for each of the alternate power paths of the transmission of FIG. 9.

DETAILED DESCRIPTION OF THE PREFERRED EMBODIMENT

Figure 1:
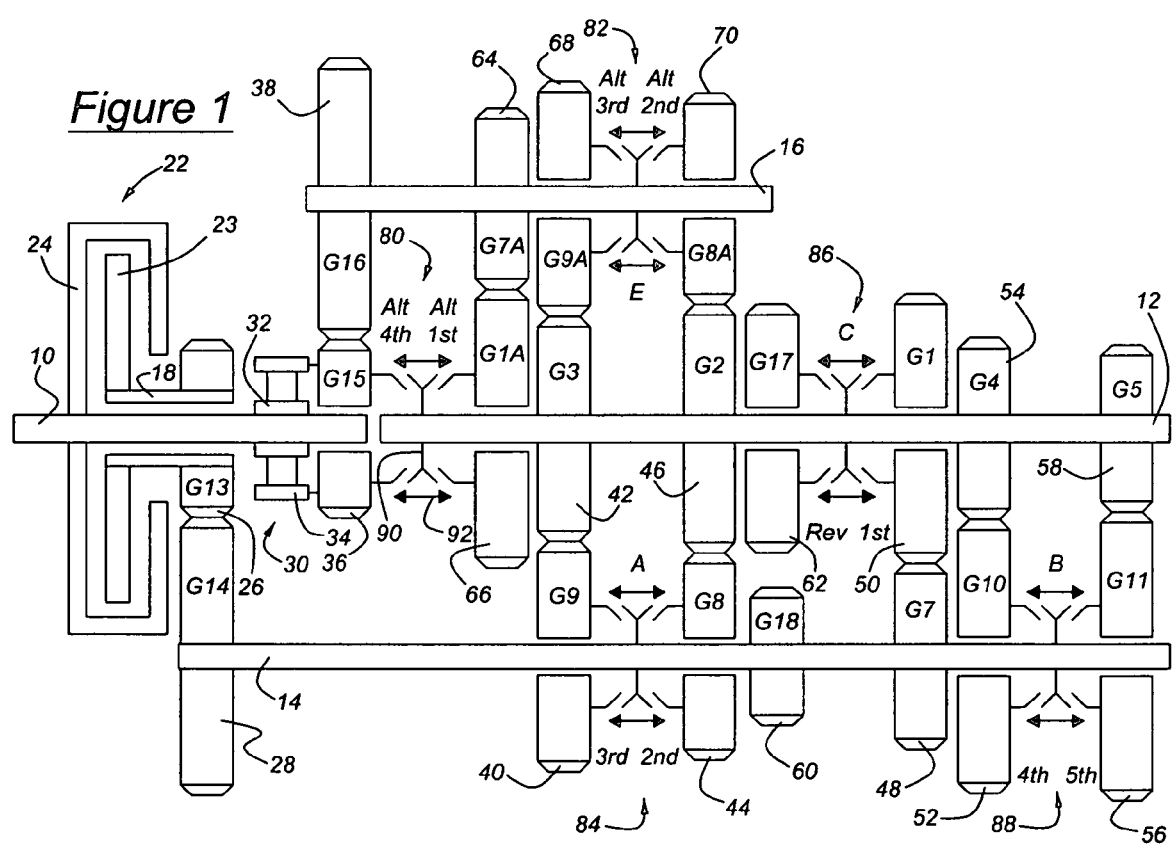
FIG. 1 is a schematic diagram showing a kinematic arrangement for a 5-speed automatic layshaft transmission according to the present invention.

Referring now to the drawings, there is illustrated in FIG. 1 a transmission according to the present invention that includes an input 10 for driveably connecting a power source such as an internal combustion engine or electric motor to the transmission, and an output 12 for driving a load, such as the driven wheels of a motor vehicle, through a powertrain that may include a drive shaft, differential mechanism and axle shafts.

A primary layshaft 14 and secondary layshaft 16 are arranged substantially parallel to the output 12. A clutched input shaft 18, preferably substantially aligned with input 10, is releasably connected to the input through a friction clutch 22, whose output element 23 frictionally engages the clutch's input element 24 when the clutch is engaged. The input element 24 is secured to input 10. Layshaft 14 carries pinions and gears that are in continually meshing engagement with gears and pinions, respectively, on the clutched input shaft 18 and output 12. Layshaft 16 carries pinions and gears that are in continually meshing engagement with gears and pinions, respectively, on the input 10 and output 12.

A pinion 26, secured to clutched input shaft 18 and connected to input 10 through clutch 22, is engaged with a gear 28, which is secured to layshaft 14.

A one-way clutch 30, secured to input 10, has an inner race 32 secured to input 10 and an outer race 34 drivably connected to a pinion 36. Input 10 supports a pinion 36, which is journalled on input 10 and in continuous meshing engagement with gear 38, secured to a secondary layshaft 16.

A primary power path for transmitting torque is established between input 10 and layshaft 14 through pinion 26 and gear 28 having a torque ratio that is approximately 1.633 when pinion 26 and gear 28 have the number of teeth specified in FIG. 2. When clutch 22 is engaged, the primary power path causes the speed of layshaft 14 to be approximately 0.612 times the speed of input 10. A secondary power path for transmitting torque is established between input 10 and layshaft 16 having a torque ratio of 1.654 when pinion 36 and gear 38 have the number of teeth specified in FIG. 2. The secondary power path causes the speed of layshaft 16 to be approximately 0.605 times the speed of input 10.

One-way clutch 30 driveably connects pinion 36 and input 10 when input 10 and pinion 36 rotate at equal speed and a positive torque is applied to input 10. Clutch 30 overruns when the speed of pinion 36 exceeds the speed of input 10.

Spaced axially along layshaft 14 are members of pinion-gear pairs, each member of a pair being in continuous meshing engagement with the other member of the pair, and each pair being associated with a particular speed ratio. For example, pinion 40, which is journalled on layshaft 14, is in continuous meshing engagement with gear 42, which is secured to output 12. Pinion 40 and gear 42 are associated with the third forward speed ratio. Pinion 44, journalled on layshaft 14, is in continuous meshing engagement with gear 46, which is secured to output 12. Pinion 44 and gear 46 are associated with the second forward speed ratio. Pinion 48, secured to layshaft 14, is in continuous meshing engagement with gear 50, which is journalled on output 12. Pinion 48 and gear 50 are associated with the first forward speed ratio. Pinion 52, which is journalled on layshaft 14, is in continuous meshing engagement with gear 54, which is secured to output 12. Pinion 52 and gear 54 are associated with the fourth forward speed ratio. Pinion 56, which is journalled on layshaft 14, is in continuous meshing engagement with gear 58, which is secured to output 12. Pinion 56 and gear 58 are associated with the fifth forward speed ratio.

Reverse pinion 60, secured to layshaft 14, is driveably connected with reverse gear 62, which is journalled on output 12. Reverse pinion 60 and reverse output gear 62 are in continuous meshing engagement with a reverse idler (not shown).

Spaced axially along layshaft 16 are members of pinion-gear pairs, each member of a pair being in continuous meshing engagement with the other member of the pair, and each pair being associated with a particular alternate speed ratio. For example, pinion 64, which is secured to layshaft 16, is in continuous meshing engagement with gear 66, which is journalled on output 12. Pinion 64 and gear 66 are associated with an alternate first forward speed ratio. Pinion 68, journalled on layshaft 16, is in continuous meshing engagement with gear 42. The pinion 68-gear 42 mesh is associated with an alternate third forward gear ratio. Pinion 70, journalled on layshaft 16, is in continuous meshing engagement with gear 46. The pinion 70-gear 46 mesh is associated with an alternate second speed ratio.

Some of the gears carried on output 12 and the pinions with which they are engaged are members of triplets comprising two pinions, one pinion being supported on layshaft 14 and the other pinion on layshaft 16, and a gear secured to output 12. For example, pinion 40, which is journalled on layshaft 14, is in continuous meshing engagement with gear 42, supported on output 12. Pinion 68, which is journalled on layshaft 16, is also in continuous meshing engagement with gear 42. Pinion 40, gear 42 and pinion 68 form a triplet, associated with the third forward speed ratio and an alternate third speed ratio. Pinion 44, gear 46 and pinion 70 form a similar triplet, associated with the second forward speed ratio and an alternate second speed ratio.

Couplers 80, 82, 84, 86 and 88 are preferably synchronizers of the type used in automotive manual transmissions to connect a gear or pinion to a shaft, after synchronizing the speed of the shaft and that of the pinion or gear. Each coupler may also disconnect the shaft and the associated pinion or gear. An example of such a synchronizer is disclosed in U.S. Pat. No. 4,222,281. Alternatively, each coupler may be a dog clutch having teeth that are engaged with dog teeth on a gear or pinion. This invention may use couplers in any combination of synchronizers and dog clutches. Each coupler is secured by a hub to output 12 or to a layshaft. For example, coupler 80 is secured by hub 90 to output 12 for rotation with the output.

In the case where a coupler is a synchronizer, it is provided with a conical surface, which engages mutually with a corresponding conical surface located on a pinion or gear adjacent the synchronizer. For example, when coupler 80 is engaging either of its adjacent pinions 36, 66, these conical surfaces are forced together into frictional contact, and that frictional engagement synchronizes the speed of the pinion to that of output 12. Each synchronizer is equipped with a sleeve 92 supported on the hub 90 for sliding movement leftward and rightward into engagement with the conical surfaces and dog teeth carried on the adjacent pinion or gear. When the teeth of the sleeve 92 engage clutch teeth on the gear, output 12 is driveably connected to the pinion 36, 66.

In the case where a coupler is a dog clutch, displacement of the sleeve 92 in opposite axial directions causes mutual engagement of dog teeth formed on the sleeve with dog teeth carried on the pinion 36, 66 or gear being engaged, such that a drive connection is made between the shaft that supports the hub of the dog clutch and the pinion or gear, but without first synchronizing the rotational speed of the shaft with the speed of the pinion or gear.

In the figures, the couplers 80–88 are shown in a neutral position, between the left-hand and right-hand extremities of travel of the connecting sleeve carried on the hub of the coupler. Engagement of the sleeve with dog teeth carried on the gear or pinion associated with the coupler completes a drive connection to the shaft, to which the coupler's hub is secured. The hubs of couplers 80 and 86 are rotatably secured to output 12; the hubs of couplers 84 and 88 are rotatably secured to layshaft 14; the hub of couplers 82 is are rotatably secured to layshaft 16.

Coupler 80, located between pinions 36, 66, releasably connects alternately those pinions to output 12, and coupler 80 may be disengaged from both pinions. Coupler 82, located between pinions 68, 70, releasably connects alternately those pinions to layshaft 16, and coupler 82 may be disengaged from both pinions. Coupler 84, located between pinions 40, 44, releasably connects alternately those pinions to layshaft 14, and coupler 84 may be disengaged from both pinions. Coupler 86, located between gears 62, 50, releasably connects output 12 alternately to those gears, and coupler 66 may be disengaged from both gears. Coupler 88, located between pinions 52, 56, releasably connects layshaft 14 alternately to those pinions, and coupler 88 may be disengaged from both pinions.

The one-way clutch 30 represents a one-way drive connection through which the input 10 is connected to pinion 36, and may be any of the following: a one-way clutch, a sprag-type one-way clutch, a roller-type one-way clutch, a mechanical diode of the type described in U.S. Pat. Nos. 5,070,978; 5,597,057 and 6,065,576; or a hydraulically actuated friction clutch having an engaged state, wherein layshaft 16 and input 10 are driveably connected, and a disengaged state, wherein layshaft 16 and input 10 are driveably disconnected.

Operation of the transmission will be discussed next with reference to the positional states of the couplers and the applied or released condition of clutch 22.

The transmission is prepared for forward acceleration of the vehicle from rest in the first gear ratio when the selector sleeve of coupler 86 is moved rightward, the other couplers 80, 82, 84 and 86 are in the neutral position, and clutch 22 is engaged. The power source continually drives pinion 26 at the speed of the power source; gear 28 is driven by pinion 26 at the speed ratio of the primary power path, i.e., 0.612 times the speed of input 10, provided the gears and pinions have the sizes of the example of FIG. 2. A second speed reduction occurs at the pinion 48-gear 50 mesh, and the resulting torque ratio is 3.525.

An upshift from first gear to second gear takes place in two stages. Before the shift starts, the sleeve of coupler 80 is moved rightward to connect output 12 and gear 66. Clutch 22 is released, so that power is transferred through clutch 30, the secondary power path pinion 36, gear 38 and secondary layshaft 16 onto the alternate first power path through pinion 64 and gear 66 to output 12. While power is carried in this power path, coupler 86 is returned to the neutral state, and the sleeve of coupler 84 is moved rightward to connect pinion 44 and primary layshaft 14. Then clutch 22 is engaged, causing clutch 30 to overrun and power to be transferred onto the second gear power path. When clutch 22 is engaged, output 12 is driven at the speed ratio of the second gear power path through clutch 22, input shaft 18, pinion 26, gear 28, primary layshaft 14, pinion 44 and gear 46. The torque ratio is 2.232. Reversing the 1-2 upshift procedure makes a 2-1 downshift.

An upshift from second gear to third gear takes place in two similar stages. Before the shift starts, the sleeve of coupler 82 is moved rightward to connect layshaft 16 and pinion 70. Clutch 22 is released, so that power is transferred through clutch 30, the secondary power path pinion 36, gear 38 and secondary layshaft 16 onto the alternate second power path through pinion 70 and gear 46 to output 12. While power is carried in this power path, the sleeve of coupler 84 is moved leftward to connect pinion 40 and primary layshaft 14. Then clutch 22 is engaged, causing clutch 30 to overrun and power to be transferred onto the third gear power path. When clutch 22 is engaged, output 12 is driven at the speed ratio of the third power path through clutch 22, input shaft 18, pinion 26, gear 28, primary layshaft 14, pinion 40 and gear 42. The torque ratio is 1.457. Reversing the 2-3 upshift procedure makes a 3-2 downshift.

An upshift from third gear to fourth gear takes place in two stages. Before the shift starts, the sleeve of coupler 82 is moved leftward to connect layshaft 16 and gear 68. Clutch 22 is released, so that power is transferred through clutch 30, the secondary power path pinion 36, gear 38 and secondary layshaft 16 onto the alternate third power path through pinion 68 and gear 42 to output 12. While power is carried in this power path, coupler 84 is returned to the neutral state, and the sleeve of coupler 88 is moved leftward to connect pinion 52 and primary layshaft 14. Then clutch 22 is engaged, causing clutch 30 to overrun and power to be transferred onto the fourth gear power path. When clutch 22 is engaged, output 12 is driven at the speed ratio of the fourth gear power path through clutch 22, input shaft 18, pinion 26, gear 28, primary layshaft 14, pinion 52 and gear 54. The torque ratio is 0.988. Reversing the 3-4 upshift procedure makes a 4-3 downshift.

An upshift from fourth gear to fifth gear takes place in two stages. Before the shift starts, the sleeve of coupler 80 is moved leftward to connect output 12 and pinion 36. Clutch 22 is released, so that power is transferred from input 10 onto the alternate fourth power path through clutch 30, pinion 36 and coupler 80 to output 12. While power is carried in this power path, the sleeve of coupler 88 is moved rightward to connect pinion 56 and primary layshaft 14. Then clutch 22 is engaged, causing clutch 30 to overrun and power to be transferred onto the fifth gear power path. When clutch 22 is engaged, output 12 is driven at the speed ratio of the fifth gear power path through clutch 22, input shaft 18, pinion 26, gear 28, primary layshaft 14, pinion 56 and gear 58. The torque ratio is 0.762. Reversing the 4-5 upshift procedure makes a 5-4 downshift.

A shift from first gear to reverse gear is produced by disengaging clutch 22, moving the sleeve of coupler 86 leftward to driveably connecting gear 62 and output 12, and re-engaging clutch 22. A reverse idler, rotatably supported on an idler shaft, reverses the direction of rotation so that reverse gear 62, which is driven by reverse pinion 60 through the idler, and output 12 turn in the opposite direction from the direction of the forward drive gears. The torque delivery path for reverse drive includes input 10, clutch 22, input shaft 18, pinion 26, gear 28, layshaft 14, pinion 60, idler, gear 62, coupler 86, and output 12. The reverse drive torque ratio is −3.181.

The example set out in FIGS. 3 and 4 was selected to produce the gear ratios that would result from the transmission embodiment of FIG. 1 and using the gear and pinion sizes of FIG. 2.

Figure 5:
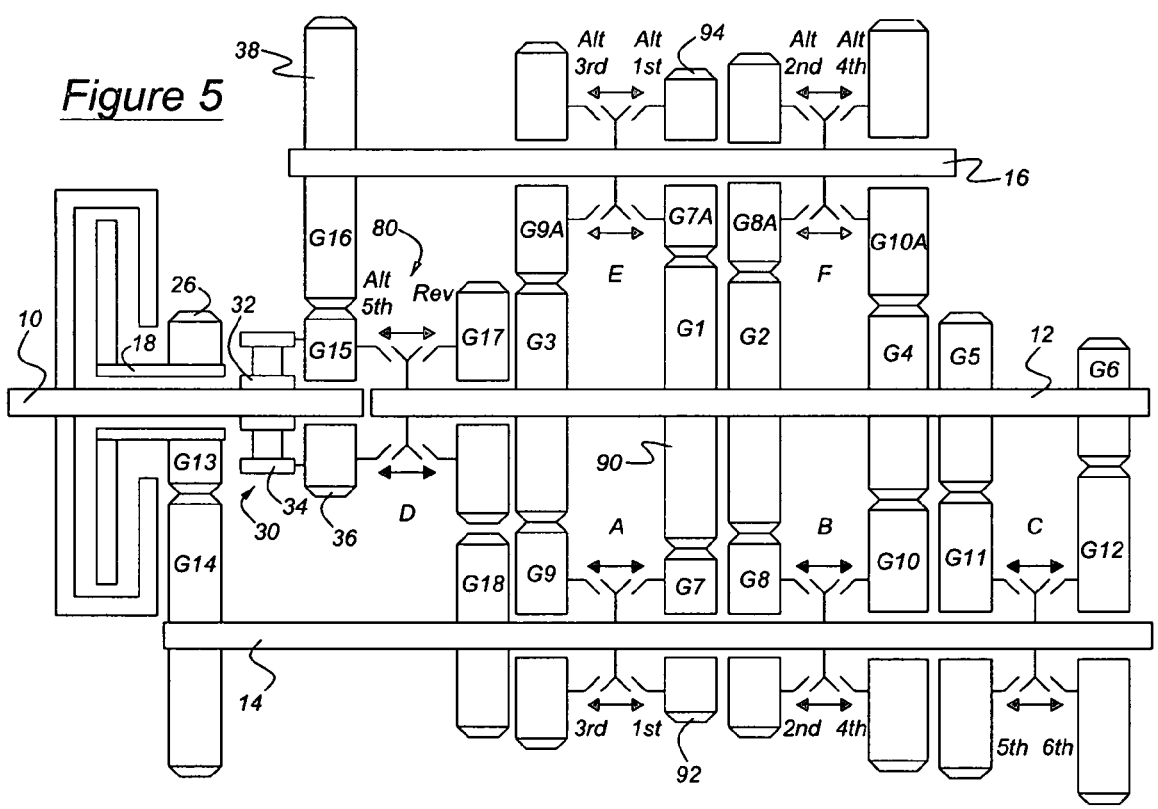
FIG. 5 is a schematic diagram showing a kinematic arrangement for a 6-speed automatic layshaft transmission according to the present invention.

The embodiment of FIG. 5, which produces six forward speeds, includes an alternate fifth gear, which is a direct drive. The alternate fifth gear is produced, as is the alternate fourth gear of the FIG. 1 embodiment, by connecting input 10 and output 12 through one-way clutch 30, pinion 36 and coupler 80. The output gear 90 for first gear is secured to output 12. Gear 90 cooperates with first gear pinion 92 and alternate first gear pinion 94 to produce first gear and alternate first gear, respectively. Pinions 92 and 94 are journalled on layshafts 14 and 16, respectively.

Figure 9:
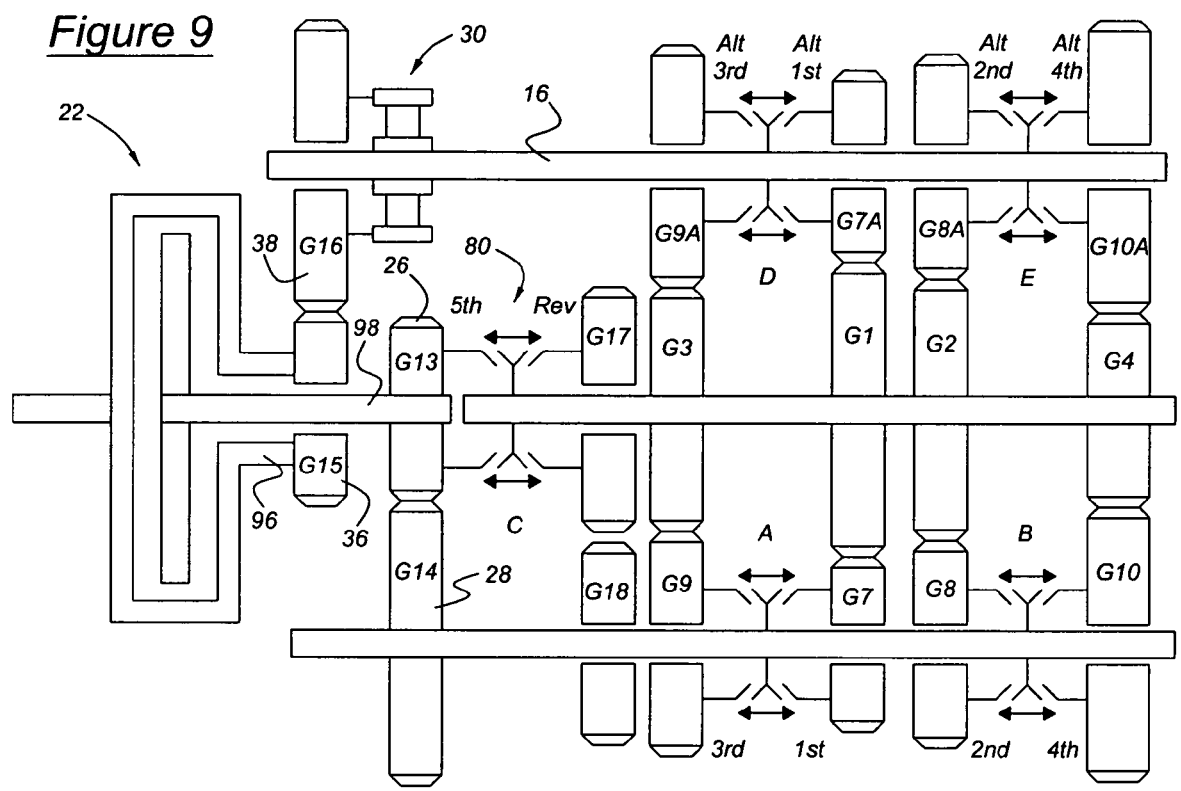
FIG. 9 is a schematic diagram showing a kinematic arrangement for a 5-speed automatic layshaft transmission according to the present invention.
Figure 13:
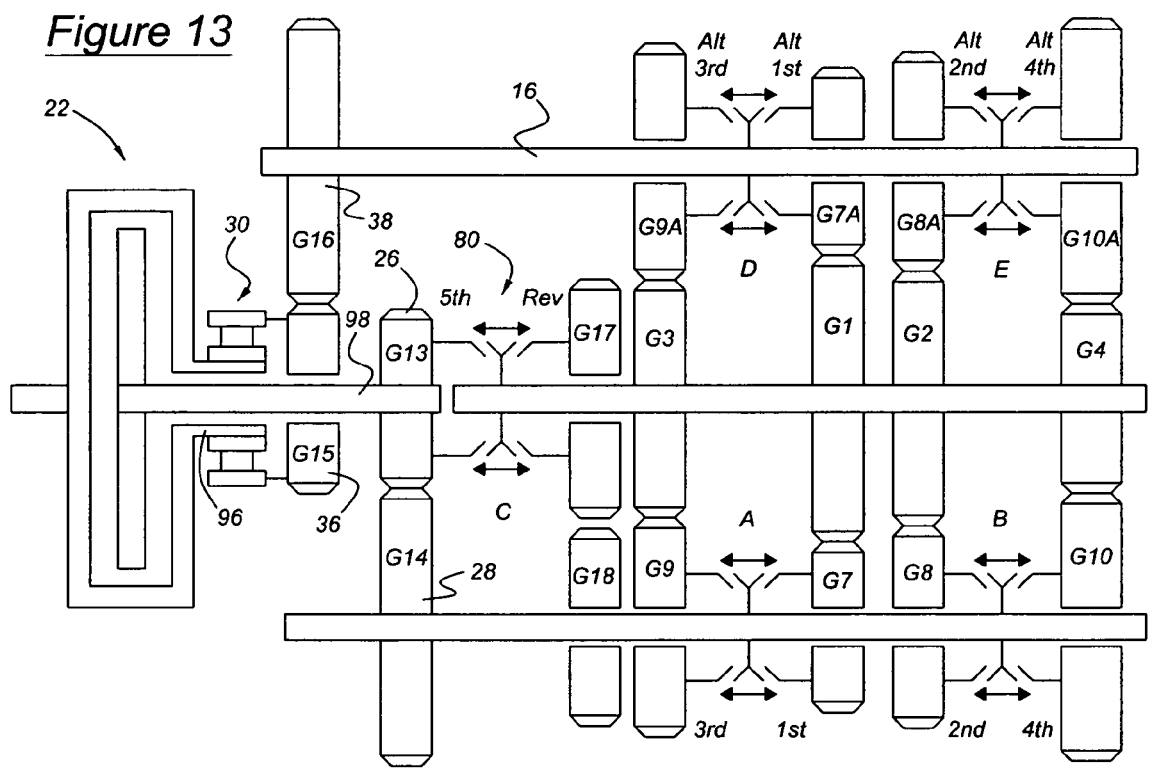
FIG. 13 is a schematic diagram showing a kinematic arrangement for a 5-speed automatic layshaft transmission according to the present invention.

The embodiments of FIGS. 9 and 13 produce five forward speeds. Fifth gear is a direct drive in which clutched input 98 and output 12 are connected through pinion 26 and coupler 80. The input 96 is a sleeve shaft, and the clutched input 98 is located inside input 96. FIG. 9 and FIG. 13 differ in the placement of one way clutch 30. In FIG. 9, one way clutch 30 is supported on secondary layshaft 16 and driveably connects gear 38 and secondary layshaft 16 whenever the speeds of those elements are equal and a positive torque is applied to the input 10. One way clutch 30 overruns whenever the speed of secondary layshaft 16 exceeds the speed of gear 38. Pinion 36 is fixed to input 96 and gear 38 is journalled on secondary layshaft 16. In FIG. 13, one way clutch 30 is supported on input 96 and driveably connects input 96 and pinion 36 whenever the speeds of those elements are equal and a positive torque is applied to the input 10. One way clutch 30 overruns whenever the speed of input 96 exceeds the speed of pinion 36. Pinion 36 is journalled on clutched input 98 and gear 38 is fixed to secondary layshaft 16.

During steady state driving when gear changes are not being made, either a primary power path or an alternate power path may be used. When a primary power path transmits power, an alternate power path may be in a neutral state, or prepared to operate in the alternate gear corresponding to the current gear, or prepared to operate in a lower gear than the current gear. When power is transmitted by an alternate power path, clutch 22 is released, and a primary path may be prepared to operate in a gear corresponding to the current alternate gear, or prepared to operate in a higher gear than the current gear.

In accordance with the provisions of the patent statutes, the principle and mode of operation of this invention have been explained and illustrated in its preferred embodiment. However, it must be understood that this invention may be practiced otherwise than as specifically explained and illustrated without departing from its spirit or scope.

What is claimed is:

1. A multiple speed ratio power transmission, comprising:
   an input supported for rotation;
   an input shaft;
   a first layshaft supported for rotation;
   a second layshaft supported for rotation;
   a first power path continually driveably connected to the input shaft for transmitting power between the input shaft and first layshaft, and producing a first ratio of a speed of the first layshaft and a speed of the input;
   a second power path for transmitting power between the input and second layshaft, and producing a second ratio of a speed of the second layshaft and a speed of the input;
   a clutch for driveably connecting and disconnecting the input and the input shaft;
   an output supported for rotation; and
   a coupler for driveably connecting and disconnecting the output and the second power path.

2. The transmission of claim 1, further comprising:
   a one-way drive connection between the second layshaft and the input shaft.

3. The transmission of claim 1, wherein the second ratio is less than the first ratio.

4. The transmission of claim 1, wherein:
   the first power path comprises a first pinion driveably connected to the input shaft, and a first gear driveably connected to the first layshaft, in meshing engagement with the first pinion; and
   the second power path comprises a second pinion journalled on the input, and a second gear driveably connected to the second layshaft, in meshing engagement with the second pinion.

5. The transmission of claim 1, wherein:
   the first power path comprises a first pinion driveably connected to the input shaft, and a first gear driveably connected to the first layshaft, in meshing engagement with the first pinion.

6. The transmission of claim 1, wherein:
   the second power path comprises a second pinion journalled on the input, and a second gear driveably connected to the second layshaft, in meshing engagement with the second pinion; and
   the coupler driveably connects and disconnects alternately the output and the second pinion.

7. A multiple speed power transmission for motor vehicles, comprising:
   an input;
   an input shaft;
   a first layshaft supported for rotation;
   a second layshaft supported for rotation;
   a first power path continually driveably connected to the input shaft for transmitting power between the input shaft and first layshaft, and producing a first ratio of a speed of the first layshaft and a speed of the input;
   a second power path for transmitting power through a one-way drive connection between the input and second layshaft, and producing a second ratio of a speed of the second layshaft and a speed of the input;
   a clutch for driveably connecting and disconnecting the input and the input shaft;
   an output supported for rotation; and
   a first coupler for driveably connecting and disconnecting the output and the second power path.

8. The transmission of claim 7, further comprising:
   a first pinion journalled on the first layshaft;
   a second pinion journalled on the second layshaft;
   a first gear supported on the output, in meshing engagement with the first pinion and second pinion;
   a second coupler for connecting and disconnecting alternately the first pinion and first layshaft; and
   a third coupler for connecting and disconnecting alternately the second pinion and second laysbaft.

9. The transmission of claim 7, wherein the one-way drive connection is a member of the group consisting of a one-way clutch, a sprag one-way clutch, a roller- one-way clutch, and a mechanical diode having an engaged state wherein the second layshaft and input are driveably connected and a disengaged state wherein the second layshaft and input are driveably disconnected.

10. The transmission of claim 8, wherein each of the first coupler, second coupler and third coupler is a member of a group consisting of a synchronizer and a dog clutch.

11. The transmission of 7, wherein the clutch is a friction clutch.

12. The transmission of claim 8, wherein:
the first power path comprises a third pinion driveably connected to the input shaft, and a third gear secured to the first layshaft in meshing engagement with said third pinion; and
the second power path comprises a one-way clutch driveably connected to the input, a fourth pinion secured to the one-way clutch, and a fourth gear secured to the second layshaft in meshing engagement with said fourth pinion.

13. The transmission of claim 7, wherein the second speed ratio is less than the first speed ratio.

14. A multiple speed power transmission for motor vehicles, comprising:
an input;
an input shaft;
a first layshaft;
a second layshaft;
a first power path continually secured to the input shaft for transmitting power between the input shaft and first layshaft, and producing a first ratio of a speed of the first layshaft and a speed of the input;
a second power path for transmitting power through a one-way drive connection between the input and second layshaft, and producing a second ratio less than a first ratio of a speed of the second layshaft and a speed of the input;
a clutch for driveably connecting and disconnecting the input and the input shaft;
an output; and
a first coupler for driveably connecting and disconnecting the output and the second power path.

15. The transmission of claim 14, further comprising:
a first pinion supported on the first layshaft;
a second pinion supported on the second layshaft;
a first gear supported on the output, in meshing engagement with the first pinion and second pinion;
a second coupler for connecting and disconnecting alternately the first pinion and first layshaft; and
a third coupler for connecting and disconnecting alternately the second pinion and second layshaft.

16. The transmission of claim 14, wherein the one-way drive connection is a member of the group consisting of a one-way clutch, a sprag one-way clutch, a roller- one-way clutch and, a mechanical diode, having an engaged state wherein the second layshaft and input are driveably connected and a disengaged state wherein the second layshaft and input are driveably disconnected.

17. The transmission of claim 15, wherein each of the first coupler, second coupler and third coupler is a member of a group consisting of a synchronizer and a dog clutch.

18. The transmission of 14, wherein the clutch is a friction clutch.

19. The transmission of claim 14, wherein:
the first power path comprises a third pinion secured to the input shaft, and a third gear secured to the first layshaft in meshing engagement with the third pinion; and
the second power path comprises a one-way clutch secured to the input, a fourth pinion driveably connected to the one-way clutch, and a fourth gear secured to the second layshaft in meshing engagement with said fourth pinion.

* * * * *